United States Patent [19]

Durda et al.

[11] Patent Number: 4,882,099
[45] Date of Patent: Nov. 21, 1989

[54] AERATION APPARATUS HAVINE A DEICING MECHANISM AND CONTROL CIRCUIT THEREFOR

[75] Inventors: Joseph A. Durda, Wazatta; Thomas G. Giese, Edina, both of Minn.

[73] Assignee: Aeration Industries, Inc., Chaska, Minn.

[21] Appl. No.: 275,522

[22] Filed: Nov. 23, 1988

[51] Int. Cl.$^4$ .............................................. B01F 3/04
[52] U.S. Cl. ................................. 261/128; 261/130; 261/131; 261/142; 261/120; 261/87; 210/242.2; 210/149
[58] Field of Search ............... 261/138, 130, 131, 142, 261/120, 87; 210/242.2, 175, 149

[56] References Cited

U.S. PATENT DOCUMENTS

| | | | |
|---|---|---|---|
| 3,836,130 | 9/1974 | Earhart et al. | 210/242.2 |
| 4,216,091 | 8/1980 | Mineau | 210/242.2 |
| 4,240,990 | 12/1980 | Inhofer et al. | 261/87 |
| 4,280,911 | 7/1981 | Durda et al. | 261/87 |
| 4,308,211 | 12/1981 | Durda | 261/87 |
| 4,741,825 | 5/1988 | Schiller | 210/242.2 |

*Primary Examiner*—Tim Miles
*Attorney, Agent, or Firm*—Banner, Birch, McKie & Beckett

[57] ABSTRACT

An aspirator aerator for inducing the flow of atmospheric air at high velocity below the surface of a substance so as to allow oxygen to freely and quickly transfer into the substance. The aerator includes an outer tubular housing having an inner tube disposed therein, one end of the housing being associated with an aspiration mechanism for inducing fluid flow through the aerator, the other end of the housing being associated with a drive for driving the aspiration mechanism. The aerator further including a deicing mechanism disposed between the inner tube and the outer tubular housing for deicing the aerator.

The aerator may further be provided with a control circuit for controlling the operation of the drive and deicing mechanism in response to a signal denoting the presence or absence of icing conditions.

27 Claims, 3 Drawing Sheets

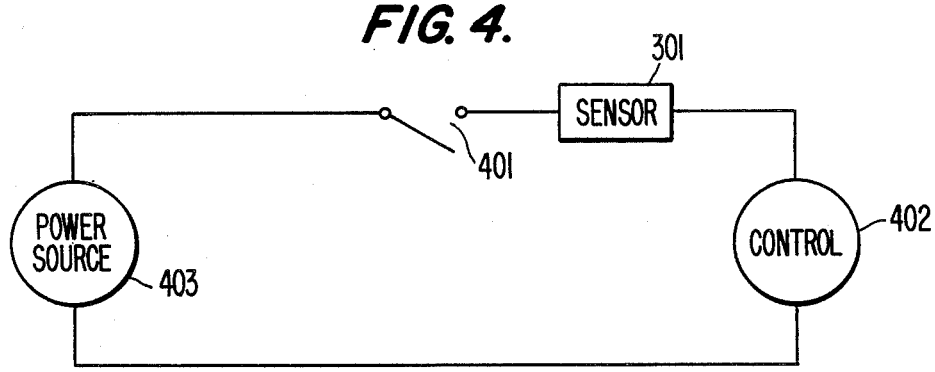
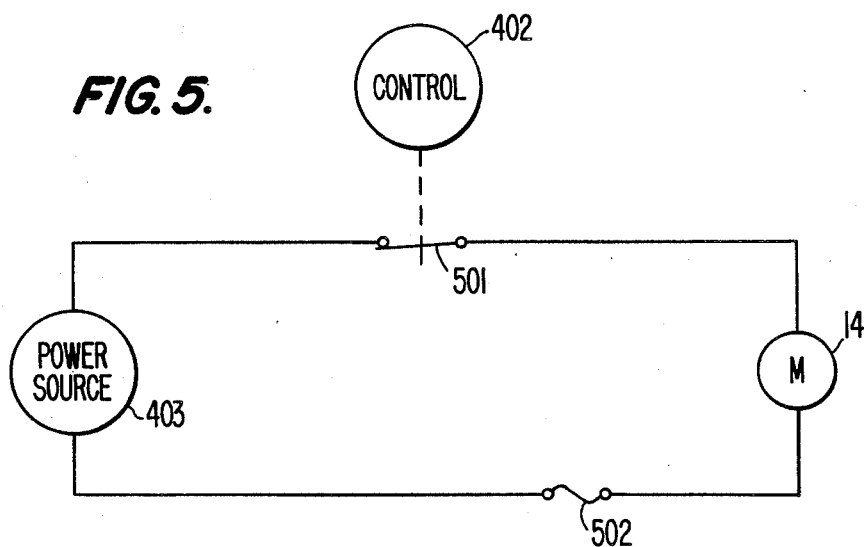
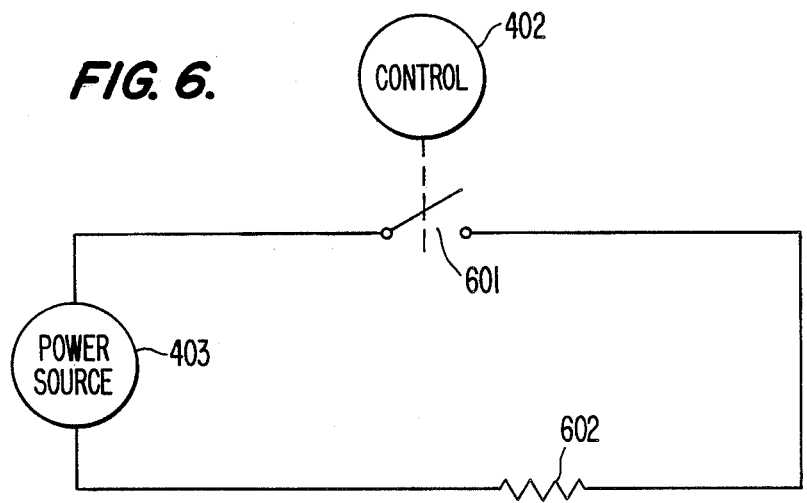

AERATION APPARATUS HAVING A DEICING MECHANISM AND CONTROL CIRCUIT THEREFOR

TECHNICAL FIELD

The present invention broadly relates to an apparatus and method for the treatment of water by aeration. More particularly, the present invention relates to an aeration apparatus having a deicing mechanism and a control circuit therefor which is responsive to an icing condition.

BACKGROUND OF THE INVENTION

Aeration apparatus are utilized in the treatment of water for the purpose of increasing the dissolved oxygen content of the water. A certain amount of dissolved oxygen is required for the life of fish and other aquatic organisms. Furthermore, dissolved oxygen is also required to prevent the formation of offensive odors and to break down organic matter in water. Therefore, aeration apparatus are especially useful in the biological purification of waste waters which contain organic solvents. It has also been found useful to increase the oxygen content of other substances, such as sludge.

Aeration apparatus used to increase the dissolved oxygen content of various substances are known. For example, U.S. Pat. No. 4,240,990 to Inhofer et al. and U.S. Pat. No. 4,280,911 to Durda et al. disclose motor driven propeller-type aerators of which the disclosures therein are hereby incorporated herein. However, such shaft powered aerators may be confronted with hostile conditions, such as temperatures below freezing. For example, if an aerator is shut off intentionally, or unexpectedly due to temporary power loss, the turbulence caused by the aerator ceases and ice typically forms at the water surface and extends several inches therebelow due to the freezing temperatures and the lack of fluid flow. As a result the aerator shaft may freeze up within the housing. Ice could also form immediately after shutdown at a location lower in the aerator assembly where the shaft bearing is positioned, if the aerator components were cooled below freezing due to colder ambient air and consequent colder air flow through the aerator components before shutdown.

Therefore, freezing temperatures may freeze the dynamic mechanisms of the aerator. As a result, those mechanisms may then undergo fatigue or even failure due to the torque of the motor when it is restarted. On the other hand, the frozen dynamic mechanisms could cause the motor to be overloaded. The resultant overramping of the motor would subject the motor to heat build-up which, if excessive, could permanently damage the motor windings. The damage may be in the order of mere reduction in expected motor life or it may require replacement of the stator, rotor or related components of the motor. As it is generally not cost effective to rewind a motor below 20 horsepower, replacement of the entire motor most likely would be necessary.

Even though the motors may have thermostatic protection therein to cut-off power input thereto in response to motor temperature rise, or be provided with circuit breakers or fuses on their input side which would cut-off power input thereto in response to excessive current draw, these protective devices may prove ineffective and the motors may still overheat. These protective devices may be undersized due to error in design or inadvertent error during replacement thereof. Furthermore, such protective devices may fail to operate as intended due to latent defects therein, or failure in the contacts therefor due to occurrences such as corrosion or the development of loose connections. Also, the above described protective devices may not respond to excessive current draw in time to prevent heat associated damage. Furthermore, even though such protective devices may provide a level of protection for the motor, after sensing an excessive current draw they must be replaced or reset before the motor may be restarted. Finally, these protective devices merely provide a cut-off function. They do not deice a frozen aerator, and therefore do not enable a frozen aerator to be started while the temperature remains below freezing. In fact, one would have to wait until the surrounding temperature rose above freezing and remained there long enough for the ice associated with the aerator to melt before using the aerator for its intended purpose. In contradistinction, the control circuit of the present invention provides a motor starter delay circuit which is integrated with a deicing circuit so that the aerator motor is cut-off during the deicing cycle and then automatically kicked-in after the deicing operation has been completed. Therefore, the aerator of the present invention has a mechanism to melt ice, which has developed within or without the aerator when the aerator has been turned off for a period of time, at below freezing conditions, so that the aerator may be subsequently started and used at temperatures above or below freezing.

Previous efforts to solve the above problems included heating the aerator. However, the heating mechanisms used, due to their designs, had to be mounted outside of the aerator housing. Therefore, the externally provided heating mechanisms were located immediate to the heat sink, e.g., the ice, and radially separated from the dynamic mechanism of the aerator by the entire aerator body. Consequently, heat transfer to the dynamic mechanisms proved to be less than desirable or even ineffective.

SUMMARY OF THE INVENTION

In view of the above and other deficiencies of the known prior art, it is the aim of the present invention to provide an aeration apparatus having a deicing mechanism which exhibits effective heat transfer characteristics and allows rapid deicing of the aerator under freezing, or even near arctic conditions, thereby preventing damage to the dynamic mechanisms of the aerator which are subject to the torque of the motor, and preventing damage to the motor which enables the motor to remain in operation.

It is another object of the present invention to provide a heating element or coil within the outer housing of an aerator, of any design, to improve heat transfer characteristics and deicing capacity.

It is a further object of the present invention to deice an otherwise frozen and therefore inoperable aerator so that the aerator motor may operate, thereby enabling the aerator to function at temperatures below freezing.

It is yet a further object of the present invention to provide an aeration apparatus having a control mechanism for controlling the actuation of the deicing mechanism and motor, in response to sensed icing conditions, to prevent motor operation when the aerator has iced, to automatically deice the aerator when an iced condition is sensed at start-up, and to start the aerator after the deicing operation has been completed.

Thus, the invention involves an aspirator aerator for inducing the flow of atmospheric air at high velocity below the surface of a substance so as to allow oxygen to freely and quickly transfer into the substance. The aerator includes an outer tubular housing having an inner rotary driven member, such as a tube, disposed therein. One end of the housing is associated with an aspiration mechanism for inducing fluid flow through the aerator, while the other end of the housing is associated with a drive for driving the aspiration mechanism. The aerator further includes a deicing mechanism disposed between the inner tube and the outer tubular housing for deicing the aerator.

The aerator may further be provided with a control circuit for controlling the operation of the drive and deicing mechanism in response to a signal denoting the presence or absence of icing conditions.

Other important features and advantages of the invention will be apparent from the following description and the accompanying drawings, wherein, for purpose of illustration only, a specific form of the invention is shown in detail.

BRIEF DESCRIPTION OF THE DRAWINGS

FIG. 4 is a block schematic diagram depicting an actuation circuit for the timed control device.

FIGS. 5 and 6 are block schematic diagrams depicting the timed control device of FIG. 4 controlling the power input to the motor and heater element, respectively.

DETAILED DESCRIPTION OF THE PREFERRED EMBODIMENT

Figure 1:
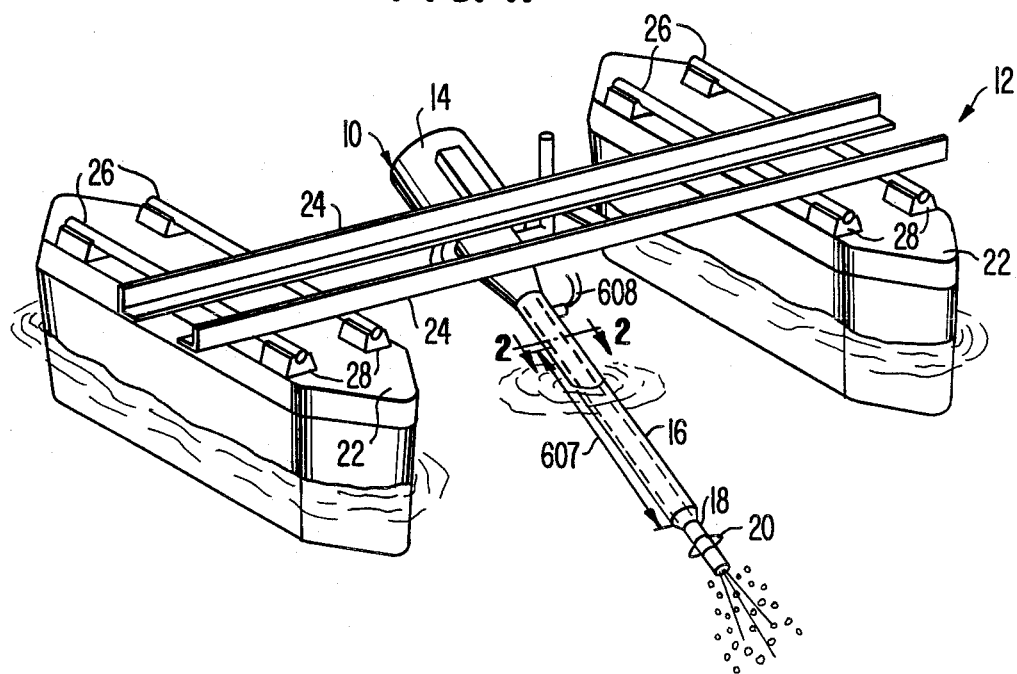
FIG. 1 is a perspective view of a float-support aerator in accordance with a preferred embodiment of the present invention.

Referring to the drawings in detail, wherein like numerals indicate like elements, FIG. 1 shows an apparatus according to a preferred embodiment of the invention. A propeller-type aspirating aerator 10 is attached to a support system 12 which is shown as supporting the aerator in a liquid. Although support system 12 is illustrated as a preferred embodiment, other support systems may be used without departing from the scope of the present invention.

Aerator 10 comprises a motor 14 attached to an outer tubular housing 16. Motor 14 is drivingly coupled to tube 18 which extends through the interior of housing 16 and out of its lower end where it is supported by a bearing mechanism (not shown). Propeller 20 is attached to the lower end of tube 18. Tube 18 functions as a rotary driven member coupled between motor 14 and propeller 20. When motor 14 rotates tube 18, propeller 20 drives the liquid surrounding it, thereby aspirating air down tube 18 and into the liquid. Alternatively tube 18 could be a solid member and air could be aspirated between the outer surface of such a solid member 18 and the inner surface of housing 16. Aerator 10, illustrated in FIG. 1, is a relatively small aerator, for example, a 2 to 15 horsepower aerator. However, other sized aerators may be used.

Support system 12 is a floatation type system, wherein a pair of floats 22 float on the liquid being aerated. Floats 22 function as vertical supports, i.e., providing support vertically above the liquid. A pair of horizontal support bars 24 are connected to floats 22 by mounting bars 26 carried in bar rests 28 on the upper surface of floats 22. Support bars 24 extend horizontally between floats 22 to function as a horizontal support which positions aerator 10 at a described horizontal location (preferably centrally) between floats 22.

Another pair of support bars (not shown) or another support mechanism may further be included to function as a support for a vortex shield (not shown) at a desired horizontal location over propeller 20, as disclosed in U.S. Pat. No. 4,741,825 issued on May 3, 1988 to A. J. Schiller, of which the disclosure therein is hereby incorporated herein.

Figure 2:
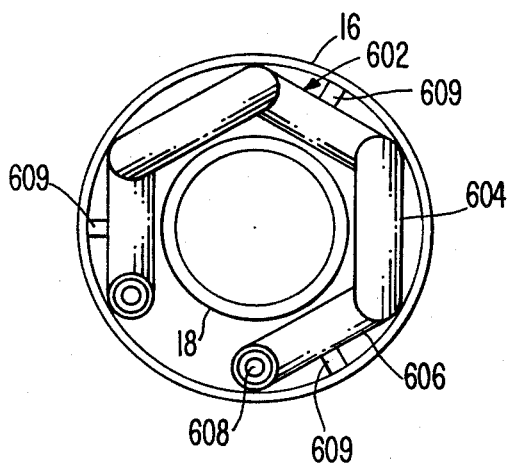
FIG. 2 is a cross-sectional view of the tubular aerator housing taken along lines 2—2 of FIG. 1, i.e., below the heater element terminals, showing the position of the heater element.
Figure 3:
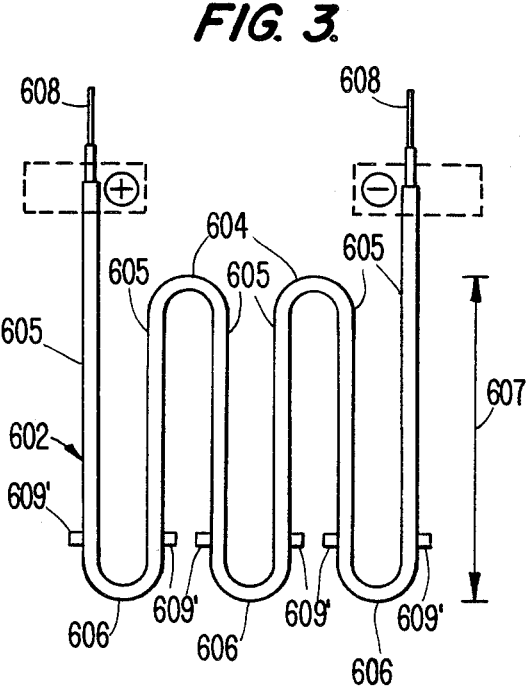
FIG. 3 is a plan view of the heater element prior to being shaped for installation into the aerator tube.

FIG. 2 shows heating element of coil 602 of FIG. 3 wrapped around inner rotating tube 18 and substantially concentrically positioned within outer tubular housing 16. As can be seen while comparing FIGS. 1-3, bends or curved portions 606 of coil 602 are disposed toward the lower propeller end of outer housing 16, while bends or curved portions 604 of coil 602 are disposed toward the upper motor end of outer housing 16. The bends or curved portions interconnect adjacent substantially straight leg portions 605 of the continuous resistive rod-like heating element. Upper bends 604 may be positioned at the upper end of outer housing 16 so that the entire heating element extends along substantially the entire length of outer housing 16. Alternatively, the entire heating element may extend less than the entire length of outer housing 16. In the latter instance, the distance between bends 604 and 606, designated by arrow 607 in FIGS. 1 and 3, should correspond to at least 50 percent of the length of outer housing 16. Also, bends 606 should be adjacent to the lower propeller end of outer housing 16. This enables the aerator to be effectively deiced. Furthermore, bends 604 preferably are positioned so as to be at or above the surface of the substance being aerated when the aerator is being used. Therefore, the portion of the heater element between and including the curved portions preferably extends from an area adjacent to the lower end of the outer housing to an area adjacent to or above the point of the outer housing which is positioned at the surface of the substance being treated when the aerator is being used. Such a portion is shown in FIGS. 1 and 3 and designated by arrow 607.

The heating element is secured to outer tubular housing 16 through securing mechanisms so as to maintain leg portions 605 in substantially parallel alignment and to maintain a clearance or space, preferably of at least 1/16 inch, between the heating element and inner rotating tube 18. The mechanism for securing the heating element to the outer tubular housing and spacing the heater element from inner rotating tube 18 may be associated with at least one leg portion 605, curved portion 604, curved portion 606, or any combination thereof. For illustrative purposes only, such a securing, aligning and spacing mechanism is generally shown as tabs in FIGS. 2 and 3. In FIG. 2, tabs 609 are depicted as being associated with curved portions 606, while in FIG. 3, tabs 609' are depicted as being associated with leg portions 605.

Heating element or coil 602 is made from electrically resistive material and includes terminals 608 for connection to a suitable power source (not shown). The resistance of heating element or coil 602 transfers the electrical energy from the power source to heat. A conventional sheathed nickel-chromium wire, or rod-like element, can be used for heating element 602. However, heater element 602 may be selected from other known resistance-type heating elements according to desired resistivity and heat output.

The configuration and construction of the heating element or coil is not limited to that depicted in FIGS. 2 and 3 as other designs may be incorporated in the present invention. However, it is important that the heater element or coil be positioned between inner tube 18 and outer tubular housing 16 and extend into the portion of the outer housing which will be submerged during use. Placement of heater element 602 in this location concentrates the heat around the dynamic parts of tube 18, and at the location where freezing is most likely to occur, e.g., where water or the substance to be treated surrounds tube 18 when the aerator is positioned for use.

Referring now to FIGS. 4, 5 and 6, a control of heating coil 602 (FIG. 2; FIG. 3) for especially heating the interior of outer tubular housing 16 and inner tube 18 (FIG. 1; FIG. 2) and of aerator motor 14 (FIG. 1) will be described. A sensor, for example, of temperature within or without housing 16 indicates an ice condition within the housing and operates control device 402 when the aerator on-off switch 401 is closed, i.e., in the on position. When switch 401 is closed, if sensor 301 senses that no icing condition exists, switches 501 and 601 remain in their normal positions shown in FIG. 5 and 6. With switch 501 closed power is supplied to motor 14 and the aeration process begins. Also, with switch 601 in the open position, no power is supplied to heater 602.

If sensor 301 senses an icing condition when switch 401 is closed, a time delay relay, or other timed control known in the art energizes control devices 402 for a preselected period of time. Control 402 in turn actuates normally closed switch contact 501 of Figure 5 and normally open switch contact 601 of FIG. 6 to their alternate states for the predetermined period of time while the time delay relay times out.

Referring now to FIG. 5, normally closed switch contact 501 opens so that power source 403 or alternative power to aerator motor 14 is turned off. Motor 14 is thus saved from damage or failure during a detected icing condition. Consequently, there is a direct relationship between detection of an icing condition and the turning off of power to aerator motor 14 whenever the aerator is initially turned on.

Supplementary protection of motor 14 is provided by fuse 502. When motor 14 is frozen or otherwise prevented from operation, or when it enters a fault condition caused by yet other conditions it may cause excessive current draw from power source 403. Consequently, when the current drawn exceeds a predetermined value represented by the rating of fuse 502, motor 14 may likewise be saved from failure. Fuse 502 thus represents an alternative mode of saving motor 14 which does not necessarily relate to detection of an icing condition, may actuate more slowly than the present invention and may be susceptible to human error. In the latter case, a user of the present invention may select a fuse 502 having too high a current rating to save motor 14. Thus, fuse 502 is supportive of, comprises a somewhat ineffective replacement for the present invention and represents the prior art. Furthermore, fuse 502 cannot perform the function of activating a heating element to alleviate the icing condition and subsequently activate the aerator in the manner of the present invention.

Referring now to FIG. 6, at the same time as motor 14 is turned off, normally open contact 601 is closed so that power is supplied to heating element 602 (FIG. 2; FIG. 3). It is intended that the predetermined period of maintenance of contacts 501 and 601 in their alternate states is related to the duration for elimination of icing by heating element 602. In other words, the calorie output of heating element 602 must be related to the volume of ice to be melted in the vicinity of housing 16 and tube 18 and the capability of power source 403 to provide sufficient power which is relatively consistent over the time period.

Control 402 most conveniently includes a time delay relay whose operation is not particularly sensitive to severe conditions of temperature and such. However, control 402 may comprise any other form of control such as a microprocessor having associated clocking or timing which controls motor 14 and heating element 602 according to a simple control program. Control 402 may alternatively comprise a simple logic gate control circuit with an associated timing circuit.

Power source 403 may be an AC or DC power source having a plurality of taps at different voltage levels for operation of different elements at different voltages. It may further comprise voltage step-up or step-down circuits, or DC to AC or AC to DC converting circuits depending on the type of elements employed and their power requirements. It is most convenient if all elements operate from the same power source 403. However, it should be realized that the motor, control device and heater element may be energized by more than one or even separate power sources.

Figure 7:
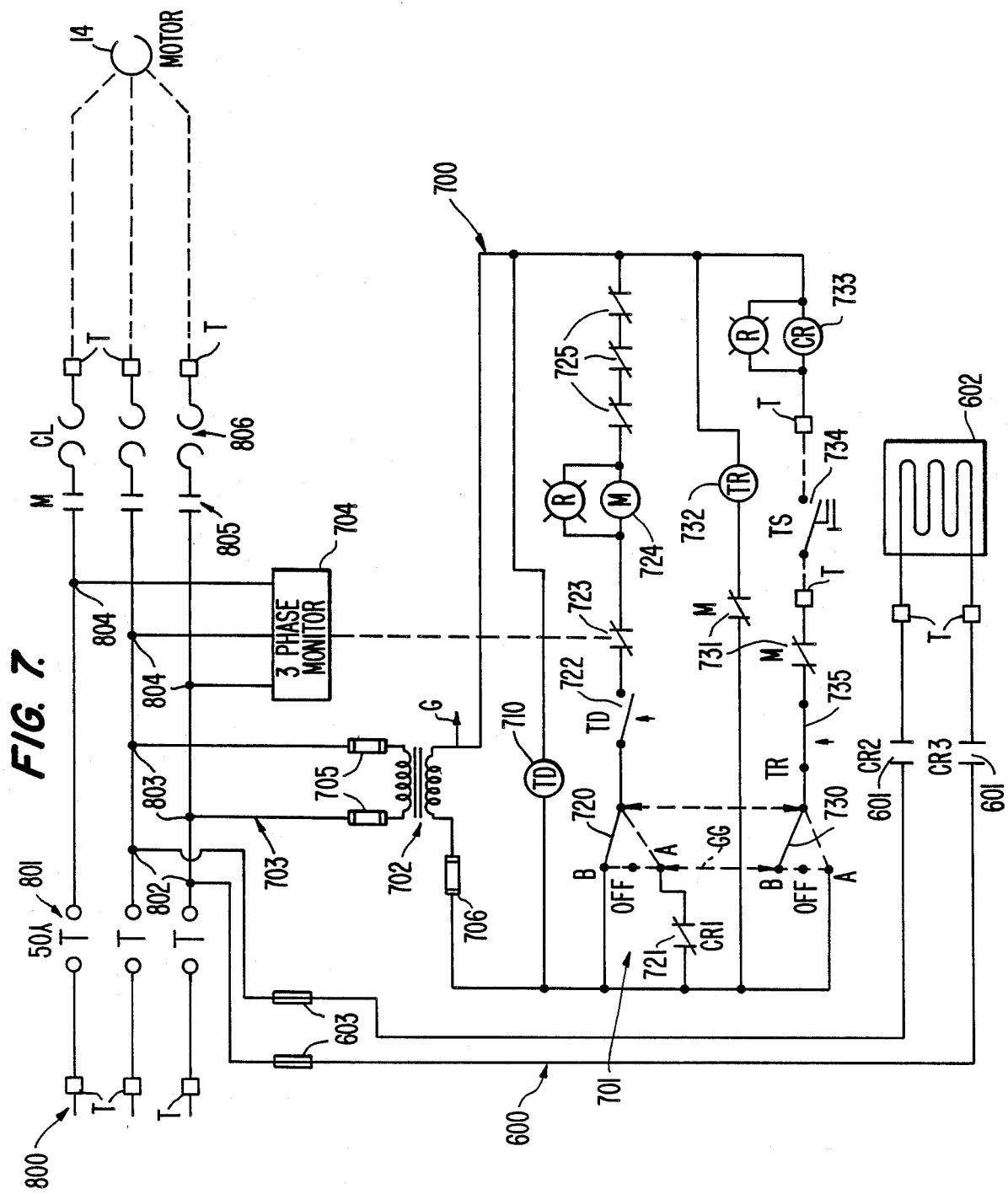
FIG. 7 shows a detailed schematic diagram of motor-heater control circuit, in accordance with a preferred embodiment of the invention.

FIGS. 4, 5 and 6 depict the basic circuit for controlling the operation of the aerator motor and heater element in response to icing conditions. It should be understood that numerous combinations of elements may be arranged to achieve the above described control without departing from the scope of the invention. FIG. 7 is an example of one of such combinations.

Referring to FIG. 7, all T's designate an electric terminal. Three phase (3) power, which, for example, may be 208, 230, 460, 375, 550 or some other voltage depending on location, is provided to main power circuit 800 which includes main breaker 801. Main power circuit 800 delivers single phase power to heater circuit 600 and control circuit 700 through taps 802 and 803, respectively, and three phase power to motor 14. Control circuit 700 controls the power delivery to motor 14 and heater element 602. Main power circuit 800 further includes motor starter contacts 805 and current overload heater elements 806 which may be of the bimetallic type. Taps 804 lead to three phase balance monitor 704.

Heater circuit 600 includes 15 amp fuses 603, heater switch contacts 601, which are controlled by control circuit 700, and heater element 602.

Control circuit 700 comprises single phase input circuit 703, which includes two 2-amp fuses 705, and step-down transformer 702. It the main power is 460 volts, step-down transformer 702, preferably having a 3:1 step-down tap, transforms the 460 volt input to 120 volts. On one side of transformer 702 is ground G, and on the other side thereof is 2 amp fuse 706 to protect the other elements of the control circuit against current exceeding 2 amps. Control circuit 700 further comprises aerator on-off ganged switch 701 having motor control branch switch 720 ganged to temperature control branch switch 730 through ganging member GG. Switch 701 is a three position switch. Upper position B actuates the testing circuit which effectively cuts out the temperature control circuit and corresponding motor switch contacts 721 so that only the motor operation is tested. Lower position A of switch 701 places both the motor control branch and temperature control branch into the effective circuit so that control circuit 700 may appropriately respond to sensed icing conditions. The intermediate position of switch 701 is the off position.

The motor control branch comprises motor switch contacts 721, branch switch 720 and time delay switch 722 which is normally open. Motor time delay 710 always remains in the circuit and closes switch 722 once a preselected interval of time has expired after actuation of switch 701. Time delay 710, for example, may have a time selection range of 1-10 seconds. Time delay 710 and time delay switch 722 perform a protective function by delaying the energization of motor 14. For example, time delay 710 performs the function of delaying the start of motor 14 until main control relay 733, discussed below, has had time to open motor switch contacts 721 when an iced condition has been sensed. The motor control branch further comprises normally closed three phase monitor control switch 723 which opens in response to three phase balance monitor 704 sensing an excessive imbalance between any two of the three motor input lines. Monitor 704 and switch 723 are optional and merely represent a further motor protection mechanism. Continuing along the motor control branch, when motor relay 724 is energized, i.e., when time delay 710 closes time delay switch 722, motor relay 724 opens normally closed auxiliary motor contacts 731 and closes motor starter contacts 805. When this occurs, running light R, which is in parallel with motor relay 724, turns on, thereby indicating that motor 14 is operating. Normally closed contacts 725 are coupled with current overloads 806. Contacts 725 open when current overloads 806 sense excessive motor current draw.

The temperature control branch of control circuit 700 comprises temperature control branch switch 730, auxiliary motor contacts 731, heater element deenergization time delay 732 having, for example, a time selection range of 1 to 240 minutes, main control relay 733, adjustable temperature thermostat or adjustable temperature sensor switch 734, and time delay switch 735. The operation of the control circuit when aerator on-off switch 701 is placed in the A position and actuated will now be described. Adjustable temperature sensor switch senses the temperature of ambient air and compares the sensed temperature to a preselected control temperature in the range of 10°-32° F., inclusive. Preferably, the control temperature is selected to be 28° F. and for purposes of this example 28° F. will be used. Therefore, when the ambient air temperature is above 28° F. temperature senor switch 734 remains open. As a result, main control relay 733 remains deenergized and normally open heater switch contacts 601 remains open, while normally closed motor switch contacts 721 remain closed. Therefore, once the preselected time of motor time delay 710 has expired, motor relay 724 opens auxiliary motor contacts 731 and closes motor starter contacts 805 which energize the aerator.

When temperature sensor 734 senses an ambient temperature below the preselected temperature, for example, 28° F., a different sequence results. When such an icing condition is sensed, temperature sensor switch 734 closes and energizes heater element deenergization time delay 732. In turn, time delay 732 delays the opening of normally closed time delay switch 735 for a preselected interval selected from a range of, for example, 1 to 240 minutes. While time delay switch 735 is closed, main control relay 733 is energized. While energized, relay 733 opens motor switch contacts 721 and closes heater switch contacts 601. As a result, no power is delivered to aerator motor 14, but power is delivered to heater element 602. Prior to energization of main control relay 733, motor time relay 710 caused motor 14 to remain deenergized as discussed above. Therefore, motor time relay 710 protects motor 14 in the case where the response time of the temperature control circuit, which opens motor switch contacts 721, would be inadequate due to conditions such as low temperatures. During the above-described deicing state, running light R, which is in parallel with main control relay 733, turns on, thereby indicating that heater element 602 is energized. The other running light, which is in parallel with motor relay 724, remains off, thereby indicating that motor 14 is not operating. Once the preselected deenergization time delay interval has expired, time delay 732 deenergizes and opens time delay switch 735. In turn, main control relay 733 deenergizes and heater switch contacts 601 open, while motor switch contacts 721 close. At this time, energization time delay 710 most probably has closed time delay switch 722 due to the time that has elapsed. Consequently, motor relay 724 is energized which opens auxiliary motor contacts 731, thereby taking the temperature sensor and heater element out of the effective circuit. Energized motor relay 724 also closes motor starter contacts 805, thereby starting the operation of the aerator.

Having described the invention in detail, it will be recognized that the foregoing is considered as illustrative only of the principles of the invention. Since numerous modifications and changes will readily occur to those skilled in the art, it is not desired to limit the invention to the exact construction, materials assembly and so forth shown and described. Accordingly, all suitable modifications and equivalents may be restored to the extent they fall within the scope of the invention and claims appended hereto.

We claim:

1. An aspirator aerator for inducing the flow of atmospheric air at high velocity below the surface of a substance so as to allow oxygen to freely and quickly transfer into the substance comprising:
    an outer tubular housing having an inner rotary driven member disposed therein, one end of said housing being associated with aspiration means for inducing fluid flow through the aerator, the other end of said housing being associated with drive means for driving said rotary driven member and the aspiration means; and
    deicing means disposed between said inner rotary driven member and said outer tubular housing for deicing the aerator.

2. An aerator in accordance with claim 1 wherein said aspiration means includes a propeller attached adjacent to a lower end of said rotary driven member.

3. An aerator in accordance with claim 2 wherein said rotary driven member is a hollow tube.

4. An aerator in accordance with claim 2 wherein said deicing means extends from an area adjacent to a lower end of said outer housing to an area adjacent to the point of the housing at the surface of the substance being aerated.

5. An aerator in accordance with claim 2 wherein said deicing means extends along at least fifty percent of the length of said outer housing.

6. An aerator in accordance with claim 1 wherein said deicing means comprises a resistive heating element.

7. An aerator in accordance with claim 6 wherein said resistive heating element comprises a sheathed rod-shaped resistance wire.

8. An aerator in accordance with claim 6 wherein said resistive heating element comprises a continuous rod-like element having a plurality of substantially straight legs which extend substantially parallel to the longitudinal axis of said outer tubular housing, are substantially concentrically positioned within said outer tubular housing and have curved portions extending therefrom and interconnecting adjacent legs thereof.

9. An aerator in accordance with claim 8 wherein said heating element is spaced from said inner rotary driven member and secured to said outer tubular housing through at least one securing mechanism to maintain said legs in substantially parallel alignment and to maintain said heating element out of contact with said rotary driven member.

10. An aerator in accordance with claim 9 wherein said at least one securing mechanism is positioned adjacent said one end of said housing associated with said aspiration means.

11. An aerator in accordance with claim 10 wherein said at least one securing mechanism includes a first portion fixed to one of said heating element curved portions and a second portion fixed to said outer tubular housing.

12. An aerator in accordance with claim 1 wherein said deicing means is associated with an electrical power source.

13. An aerator in accordance with claim 1 wherein said aerator further includes control means for controlling the actuation of the deicing means in response to icing conditions.

14. An aerator in accordance with claim 1 wherein said aerator further includes control means for controlling the operation of said drive means in response to a signal denoting the presence or absence of icing conditions.

15. An aerator in accordance with claim 14 wherein said control means comprises a timed control device operatively associated with said drive means for controlling input power to said drive means.

16. An aerator in accordance with claim 15 wherein said timed control device includes timing means for holding the timed control device actuated and the motor deactuated for a predetermined peroid of time.

17. An aerator in accordance with claim 1 wherein said aerator further includes control means for controlling the operation of said deicing means in response to a signal denoting the presence or absence of icing conditions.

18. An aerator in accordance with claim 17 wherein said control means comprises a timed control device operatively associated with said deicing means for controlling input power to said deicing means.

19. An aerator in accordance with claim 18 wherein said timed control device includes timing means for holding the timed control device actuated and the deicing means actuated for a predetermined period of time.

20. An aerator in accordance with claim 17 wherein said control means further controls the operation of said drive means in response to said signal denoting the presence of absence of icing conditions.

21. An aerator in accordance with claim 20 wherein said control means comprises a timed control device operatively associated with said drive and deicing means for controlling input power to said drive and deicing means.

22. An aerator in according with claim 21 wherein said timed control device includes timing means for holding the timed control device actuated for a predetermined period of time in response to said signal denoting the presence of an icing condition, thereby maintaining the deicing means actuated and the drive means deactuated for said predetermined period of time.

23. An aspirator aerator for inducing the flow of atmospheric air at high velocity below the surface of a substance so as to allow oxygen to freely and quickly transfer into the substance comprising:

an outer tubular housing having a rotary driven member disposed therein, one end of said housing being associated with aspiration means for inducing fluid flow thorogh the aerator, the outer end of said housing being associated with drive means for driving the aspiration means;

deicing means associated with said aerator for deicing the aerator;

sensing means for sensing the presence or absence of icing conditions and generating a signal representative thereof; and control means for controlling the operation of said drive means and deicing means in response to said signal denoting the presence or absence of icing conditions.

24. An aspirator aerator in accordance with claim 23 wherein said control means includes a timed control device comprising timing means for holding the timed control device actuated for a predetermined period of time in response to said signal denoting the presence of icing condition, thereby maintaining the deicing means actuated, and the drive means deactuated for said predetermined period of time.

25. A method of actuating an aspirator-type aerator having a deicing mechanism and aspirator drive, and which is used for inducing the flow of atmospheric air at high velocity below the surface of a substance so as to allow oxygen to freely and quickly transfer into the substance comprising the steps of:

sensing the temperature adjacent the aerator;

actuating the aspirator drive when the sensed temperature is above freezing;

deactuating the aspirator drive and actuating the deicing mechanism for a predetermined period of time when the sensed temperature is at or below freezing; and actuating the aspirator drive and deactuating the deicing mechanism after the predetermined period of time has lapsed.

26. A method in accordance with claim 25 wherein the sensing step comprises sensing ambient air in the vicinity of the aerator.

27. A method in accordance with claim 25 wherein the step of actuating the deicing mechanism comprises delivering electrical power to a heater element disposed within the aerator for removing ice therefrom.

* * * * *

UNITED STATES PATENT AND TRADEMARK OFFICE
CERTIFICATE OF CORRECTION

PATENT NO. : 4,882,099

DATED : November 21, 1989

INVENTOR(S) : Joseph A. Durda and Thomas G. Giese

It is certified that error appears in the above-identified patent and that said Letters Patent is hereby corrected as shown below:

On the first page of the Letters Patent, paragraph [54], in the title, "HAVINE" should be --HAVING--;

On the first page of the Letters Patent, paragraph [75] "Wazatta" should be --Wayzata--; and Column 1, in the title, line 2, "HAVINE" should be --HAVING--.

Signed and Sealed this

Eighteenth Day of December, 1990

Attest:

HARRY F. MANBECK, JR.

*Attesting Officer*      *Commissioner of Patents and Trademarks*